C. W. Smart,
Automatic Gate,
Nº 18,932. Patented Dec. 22, 1857.
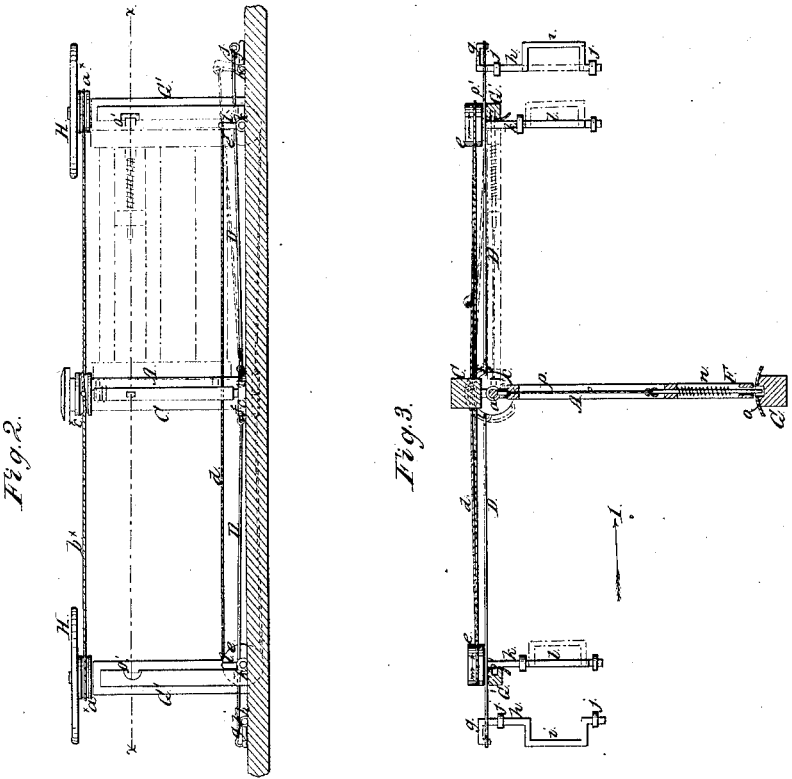
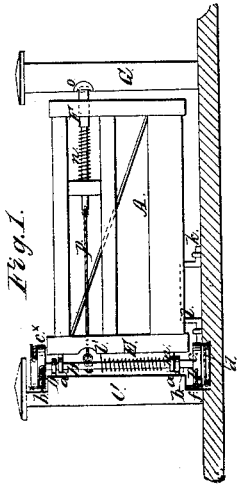

UNITED STATES PATENT OFFICE.

C. W. SMART, OF WATERTOWN, NEW YORK.

APPROACH-OPENING FARM-GATE.

Specification of Letters Patent No. 18,932, dated December 22, 1857.

*To all whom it may concern:*

Be it known that I, C. W. SMART, of Watertown, in the county of Jefferson and State of New York, have invented a new and Improved Self-Acting Automatic Gate; and I do hereby declare that the following is a full, clear, and exact description of the same, reference being had to the annexed drawings, making a part of this specification, in which—

Figure 1, is a side view of my improvement in a closed state. Fig. 2, is an end view of ditto in a closed state the gate being shown open in red. Fig. 3, is a horizontal section of ditto taken in the line $(x)$ $(x)$ Fig. 2.

Similar letters of reference indicate corresponding parts in the several figures.

This invention consists in combining the catch or bolt which secures the gate in an open and closed state with a spring which actuates the gate, the parts being so arranged that as the catch or bolt is withdrawn and the gate released the spring will by the same mechanism be wound up and receive strength to actuate the gate as soon as the gate is fully released by the withdrawal of the catch or bolt.

To enable those skilled in the art to fully understand and construct my invention I will proceed to describe it.

A represents a gate of usual or any proper form of construction. This gate is hung loosely by eyes $(a)$ $(a)$ to a vertical shaft B, which is fitted in bearings $(b)$, $(b)$ attached to a post C. The gate is allowed to turn freely on the shaft B, while the latter is stationary. The shaft B is also allowed to turn freely in its bearings $(b)$, $(b)$. The shaft B therefore may turn without actuating the gate, and the gate may be turned without actuating the shaft.

To the lower end of the shaft B a pulley $(c)$ is attached and an endless chain $(d)$ is passed once or twice around said pulley, said chain also passing around pulleys $(e)$ $(e)$ one at each side of the gate and at suitable distances from it see Figs. 2 and 3. To the periphery of the pulley $(c)$ there is also attached a segment rod $(f)$ and rods D, D, are attached to the segment rod $(f)$. These rods D extend one from each side of the gate, and are attached to cranks $(g)$ at the ends of shafts $(h)$ which are so bent as to have projections $(i)$ $(i)$ formed on them. The shafts $(h)$ are fitted in suitable bearings $(j)$ placed in proper timbers which may be sunk in the ground and arranged in any proper way. The pulleys $(e)$ $(e)$ are also placed on similar shafts $(k)$ $(k)$, bent so as to have projections $(l)$ formed on them.

The shafts $(k)$ $(k)$ $(h)$ $(h)$ are so arranged that their projections rise and fall simultaneously, and when the projections of the shafts $(k)$ are elevated those of the shaft $(h)$ are depressed, and vice versa, see more particularly Fig. 2. On the shaft B a spiral spring E is placed. The upper end of this spring is attached to the gate as shown at $(l')$, see Fig. 1, and its lower end is attached to the shaft B, as shown at $(m)$.

F is a slide bolt fitted on the gate A and having a spiral spring $(n)$ around it which spring has a tendency to keep the bolt shot forward within a nosing $(o)$ in the post G, see Fig. 1. This spring slide bolt is constructed and arranged in the usual way and therefore a more minute description is not necessary. To the inner end of the bolt F a cord or chain $(p)$ is attached and this cord or chain is connected to the shaft B.

The operation is as follows.—Suppose the gate to be closed, and a vehicle approaching it in the direction indicated by arrow 1, the projection $(i)$ of the shaft $(h)$ being depressed the wheels of the vehicle will depress the projection $(l)$ of the shaft $(k)$ which projection will be elevated, and as said projection is depressed the pulley $(c)$ by means of the chain $(d)$ will be turned or rotated, and also of course the shaft B. As the shaft B is turned the cord or chain $(p)$ will be wound on the shaft B, and the bolt F withdrawn from the nosing $(o)$ in the post G. As the shaft B is turned the spring E is wound up, or contracted, and by the time the bolt is fully withdrawn from the nosing $(o)$ and the gate released, the spring E will have been wound up or sufficiently contracted to have the requisite force to throw open the gate which as it is thrown open is retained in consequence of its bolt passing into a nosing $(o')$ in a post G'. These posts G' are at either side of the gate, and the gate is closed by the carriage depressing the projection $(i)$ on the shaft $(h)$ which projection was raised as the vehicle depressed the projection $(l)$ in opening the gate. As the projection $(i)$ is depressed the rod D actuates the pulley $(c)$ and rotates the shaft B so that the spring and bolt will be actuated as before. I would remark that persons on foot may actuate the shaft B by means of hand wheels H placed on the posts G', and having pulleys ($a^x$) on their axes around which pulleys an endless chain ($b^x$) may pass, said chain also passing around a pulley ($c^x$) on the upper end of shaft B.

I do not claim broadly the actuating of a bolt or catch and the opening and closing of a gate automatically by the passing of the wheels of a vehicle over levers or projections to actuate mechanism arranged for the purpose, for various plans have been devised for effecting this object, nor do I claim the arrangement of levers and cords for withdrawing and then pulling open the gate, as in J. K. Webber's patent, 1855; but,

Having thus described my invention what I claim as new and desire to secure by Letters Patent, is—

The combination of the slide bolt F, and spring E, arranged and actuated as shown or in an equivalent way so that by the withdrawal of the slide bolt the spring will be wound up or contracted and have sufficient strength to throw open and close the gate by the time the bolt is fully withdrawn and the gate released.

C. W. SMART.

Witnesses:
M. S. RIDDELL,
JNO. C. STERLING.